(12) United States Patent
Mena Paz et al.

(10) Patent No.: US 10,977,489 B2
(45) Date of Patent: Apr. 13, 2021

(54) IDENTIFICATION OF NATURAL FRACTURES IN WELLBORE IMAGES USING MACHINE LEARNING

(71) Applicant: International Business Machines Corporation, Armonk, NY (US)

(72) Inventors: Carmen N. Mena Paz, Rio de Janeiro (BR); Matthias Kormaksson, New York, NY (US); Paulo R. Cavalin, Rio de Janeiro (BR); Paul Borrel, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 16/182,818

(22) Filed: Nov. 7, 2018

(65) Prior Publication Data
US 2020/0143139 A1 May 7, 2020

(51) Int. Cl.
*G06K 9/00* (2006.01)
*G01V 1/40* (2006.01)
(Continued)

(52) U.S. Cl.
CPC ............. *G06K 9/0063* (2013.01); *G06K 9/40* (2013.01); *G06K 9/6262* (2013.01); *G06N 3/0427* (2013.01)

(58) Field of Classification Search
USPC ....... 382/100, 103, 106, 108, 156, 168, 173, 382/181, 190, 219, 220, 224, 254, 276, (Continued)

(56) References Cited

U.S. PATENT DOCUMENTS 7,457,194 B2 * 11/2008 Prioul ...................... G01V 1/50
181/105
9,238,942 B2 1/2016 Moos et al.
(Continued)

FOREIGN PATENT DOCUMENTS

CN 103616390 B 5/2016

OTHER PUBLICATIONS

Al-Sit, Waleed Tayseer; "Automatic Feature Detection and Interpretation in Borehold Data"; Jun. 2015; Copyright Waleed Al-Sit 2015; pp. 130.
(Continued)

*Primary Examiner* — Seyed H Azarian
(74) *Attorney, Agent, or Firm* — Stephen R. Yoder (57) ABSTRACT

A system, method and program product for processing borehole images to delineate between natural fractures and induced fractures. A system is disclosed that includes: an image analysis platform that inputs a noisy image from a borehole, processes the image using a set of filtering strategies, and renders a set of suggested filtered images via a user interface, the user interface including a mechanism for allowing a user to choose a selected filtered image from the set of suggested filtered images that best delineates between natural fractures and induced fractures, and wherein the image analysis platform further includes a feedback system for packaging and outputting the noisy image and selected filtered image as feedback; and a learning platform having a knowledge registration system that collects and stores training data and the feedback and in a knowledgebase, and a machine learning system that generates filtering strategies.

20 Claims, 4 Drawing Sheets

(51) Int. Cl.
*G06K 9/62* (2006.01)
*G06K 9/40* (2006.01)
*G06N 3/04* (2006.01)

(58) Field of Classification Search
USPC .......... 382/291, 305, 312, 260, 109; 703/10; 181/105
See application file for complete search history.

(56) References Cited

U.S. PATENT DOCUMENTS

| | | | |
|---|---|---|---|
| 9,829,591 B1 | 11/2017 | Yu et al. | |
| 2010/0250214 A1 | 9/2010 | Prioul et al. | |
| 2011/0064277 A1 | 3/2011 | Duncan et al. | |
| 2011/0091078 A1 | 4/2011 | Kherroubi et al. | |
| 2018/0034281 A1* | 2/2018 | Tsai | H02J 50/80 |
| 2018/0087321 A1* | 3/2018 | Johnston | G05B 19/02 |
| 2018/0088252 A1* | 3/2018 | Borrel | G01V 99/005 |
| 2018/0347281 A1* | 12/2018 | Duplantis | E21B 7/068 |
| 2019/0147125 A1* | 5/2019 | Yu | E21B 21/08 703/10 |
| 2019/0277124 A1 | 9/2019 | Yarus et al. | |

OTHER PUBLICATIONS

Barton, Colleen A.; "Discrimination of Natural Fractures from Drilling-Induced Wellbore Failures in Wellbore Image Data-Implications for Reservoir Permeability"; SPE International Petroleum Conference and Exhibition in Mexico; Feb. 1-3; Published Society of Petroleum Engineers; Publication Date 2000; pp. 2; <https://www.onepetro.org/conference-paper/SPE-58993-MS>.

Al Kindi, Zainab S. et al.; "Successful Characterization Using Images in Real-Time Interpretation: A Challenging Lateral Well from Ultra High Resolution Microscope Measurement"; Search and Discovery Article #41457; Posted Oct. 6, 2014; pp. 11.

* cited by examiner

IDENTIFICATION OF NATURAL FRACTURES IN WELLBORE IMAGES USING MACHINE LEARNING

TECHNICAL FIELD

The subject matter of this invention relates to analyzing wellbore images and more particularly to a system and method of characterizing fractures in wellbore images using machine learning.

BACKGROUND

Oil and gas remains an important source of energy for most of the world. However, because exploration largely remains an inexact science, the costs associated with locating sources of petrochemicals under the ground are significant. The more precisely geological features can be understood, the greater the likelihood of success.

One common approach utilized in exploration is to analyze image data collected from wells to understand the geological structure and identify potential reservoirs. One particularly useful type of information is the identification of natural fractures. A natural fracture is any separation in a geologic formation, such as a joint or a fault that divides the rock into two or more pieces. A fracture will sometimes form a deep fissure or crevice in the rock. Fractures are commonly caused by stress exceeding the rock strength, causing the rock to lose cohesion along its weakest plane. Fractures can provide permeability for fluid movement, such as water or hydrocarbons. Highly fractured rocks can make good aquifers or hydrocarbon reservoirs, since they may possess both significant permeability and fracture porosity. US20180088252A1 entitled "System, method and computer program product for fracture pattern characterization in naturally fractured reservoirs," filed on Sep. 27, 2016, which is hereby incorporated by reference, provides techniques for characterizing natural fractures from image data.

Unfortunately, image data collected from drilled wells often include noise, e.g., fractures that occur during the actual drilling process. These noisy patterns complicate the detection and characterization of relevant fracture patterns, thus limiting the usefulness of the collected image data.

SUMMARY

Aspects of the disclosure provide a cognitive fracture identification approach for separating natural fracture data from noise in well images. The process further recommends a best approach for analyzing different types of images. Image classification, based for instance on texture descriptors or convolutional neural networks, can be used to identify the type of image and to define which types of fractures should be identified as natural fractures.

A first aspect discloses a fracture analysis system that processes borehole images to delineate between natural fractures and induced fractures, comprising: an image analysis platform that inputs a noisy image from a borehole, processes the image using a set of filtering strategies, and renders a set of suggested filtered images via a user interface, the user interface including a mechanism for allowing a user to choose a selected filtered image from the set of suggested filtered images that best delineates between natural fractures and induced fractures, and wherein the image analysis platform further includes a feedback system for packaging and outputting the noisy image and selected filtered image as feedback; and a learning platform having a knowledge registration system that collects and stores training data and the feedback and in a knowledgebase, and a machine learning system that generates filtering strategies that can be applied to noisy images to delineate between natural fractures and induced fractures based on the feedback and training data for different types of borehole images.

A second aspect discloses a computer program product stored on a computer readable storage medium, which when executed by a computing system, processes borehole images to delineate between natural fractures and induced fractures, the program product includes: program code that inputs a noisy image from a borehole; program code that processes the noisy image using a set of filtering strategies; program code that renders a set of suggested filtered images via a user interface; program code that allows a user to choose a selected filtered image from the set of suggested filtered images via the user interface that best delineates between natural fractures and induced fractures; program code that packages and outputs the noisy image and selected filtered image as feedback; program code that collects and stores training data and the feedback in a knowledgebase; and program code that generates filtering strategies that can be applied to noisy images to delineate between natural fractures and induced fractures based on the feedback and training data for different types of borehole images.

A third aspect discloses a computerized method for processing borehole images to delineate between natural fractures and induced fractures, comprising: inputting a noisy image from a borehole; processing the noisy image using a set of filtering strategies; rendering a set of suggested filtered images via a user interface; receiving from a user a selected filtered image from the set of suggested filtered images via the user interface that best delineates between natural fractures and induced fractures; packaging and outputting the noisy image and selected filtered image as feedback; collecting and storing training data and the feedback in a knowledgebase; and generating the filtering strategies that can be applied to noisy images to delineate between natural fractures and induced fractures based on the feedback and training data for different types of borehole images.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Figure 1:
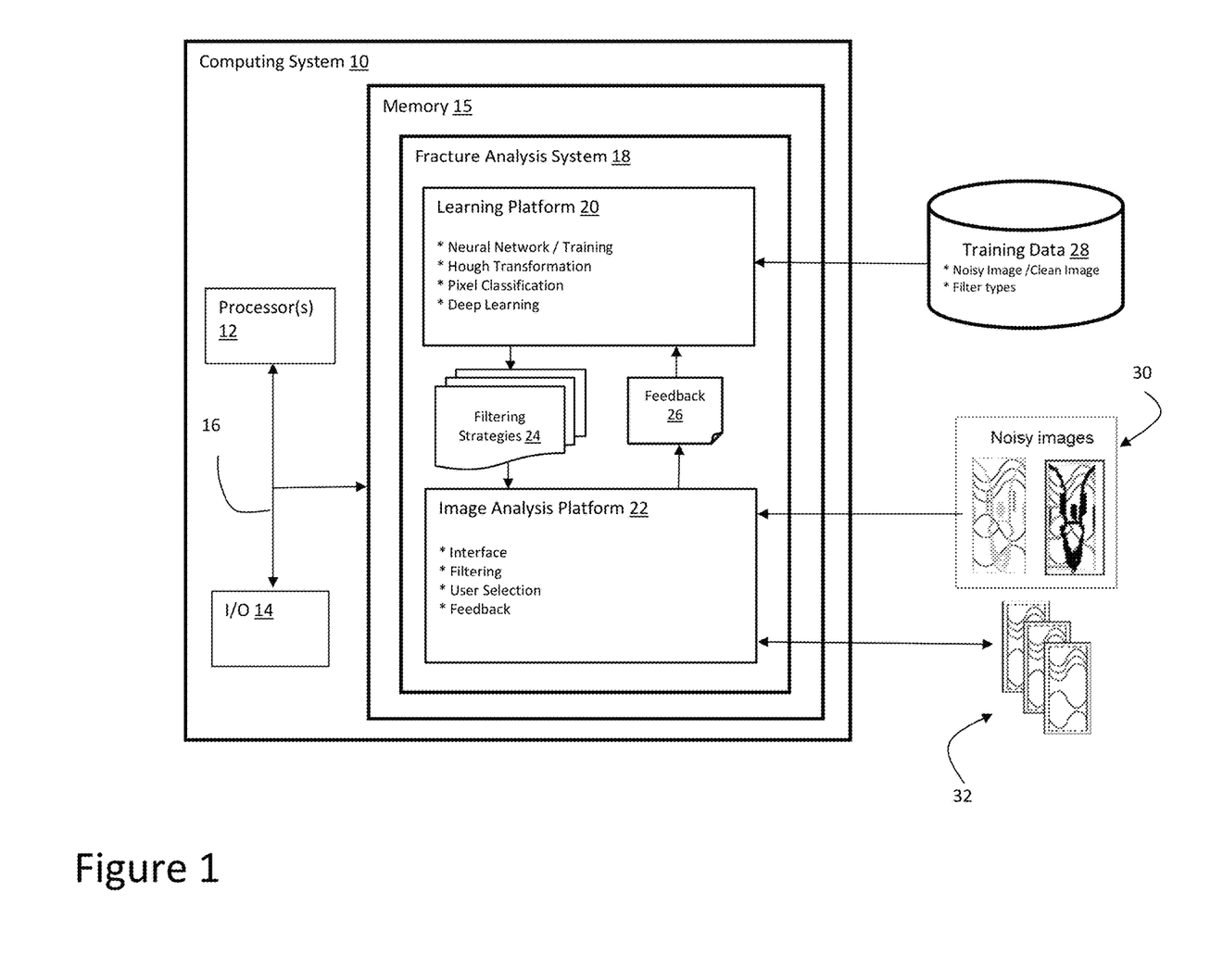
FIG. 1 shows a fracture analysis system according to embodiments.

Referring now to the drawings, FIG. 1 depicts a computing system 10 having a fracture analysis system 18 for delineating between natural fractures and induced fractures in well bore images. Fracture analysis system 18 generally includes a learning platform 20 that generates filtering strategies 24 for an image analysis platform 22 based on training data 28 and feedback 26 from the image analysis platform 22. Using the filtering strategies 24, image analysis platform 22 inputs one or more noisy images 30 and generates a set of suggested filtered images 32 for each inputted image 30. A user can review the images 32 and select a filtered image from the set of suggested filtered images 32 that best delineates natural fractures from induced fractures. The selection can for example be based on the user's experience and expertise, as well as recommendations generated by the learning platform 20. The selected image can then be used to facilitate exploration/drilling processes. In addition, the selected image and original noisy image 30 are provided as feedback 26 to further train the learning platform 20.

Figure 2:
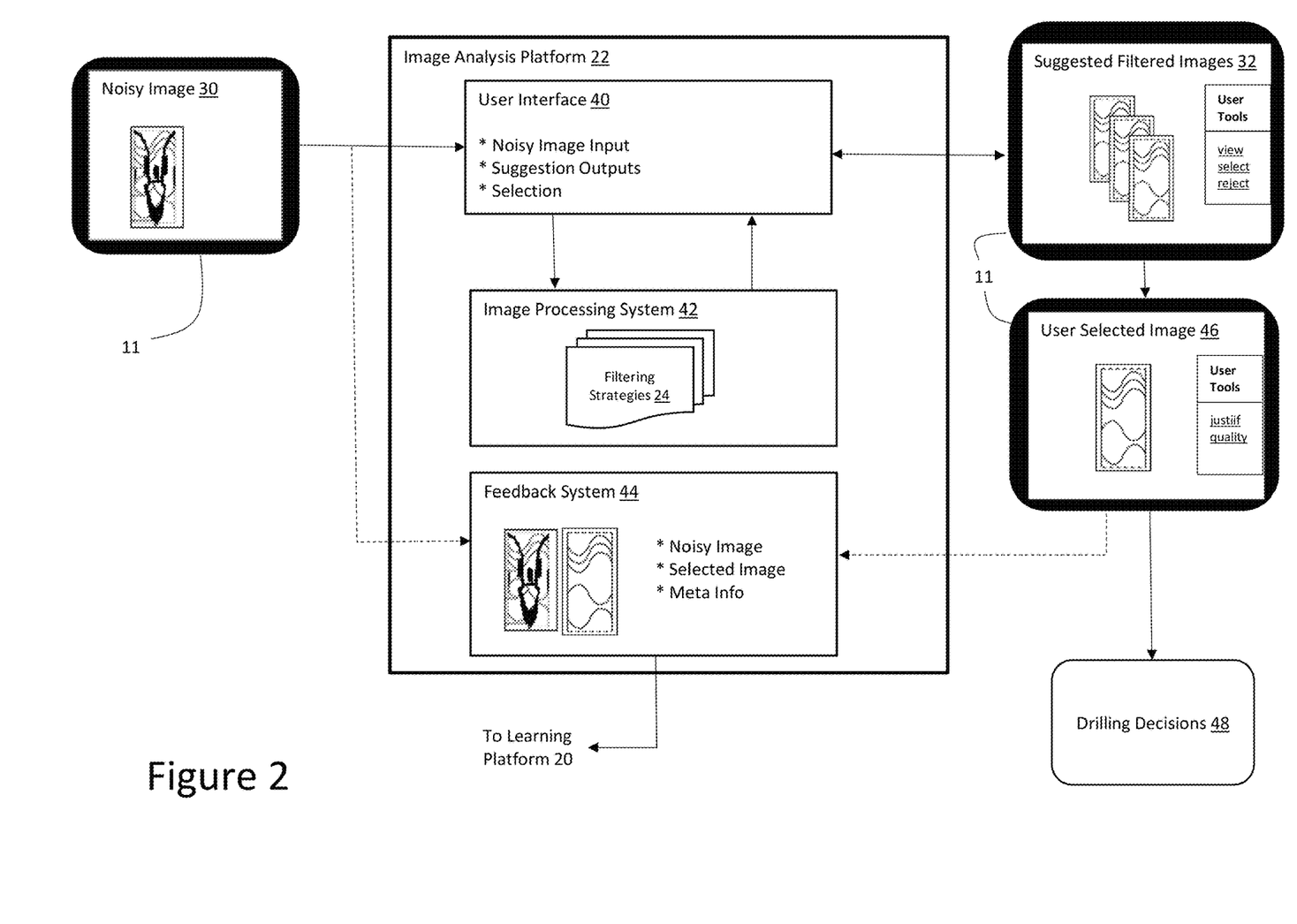
FIG. 2 shows an image analysis platform according to embodiments.
Figure 3:
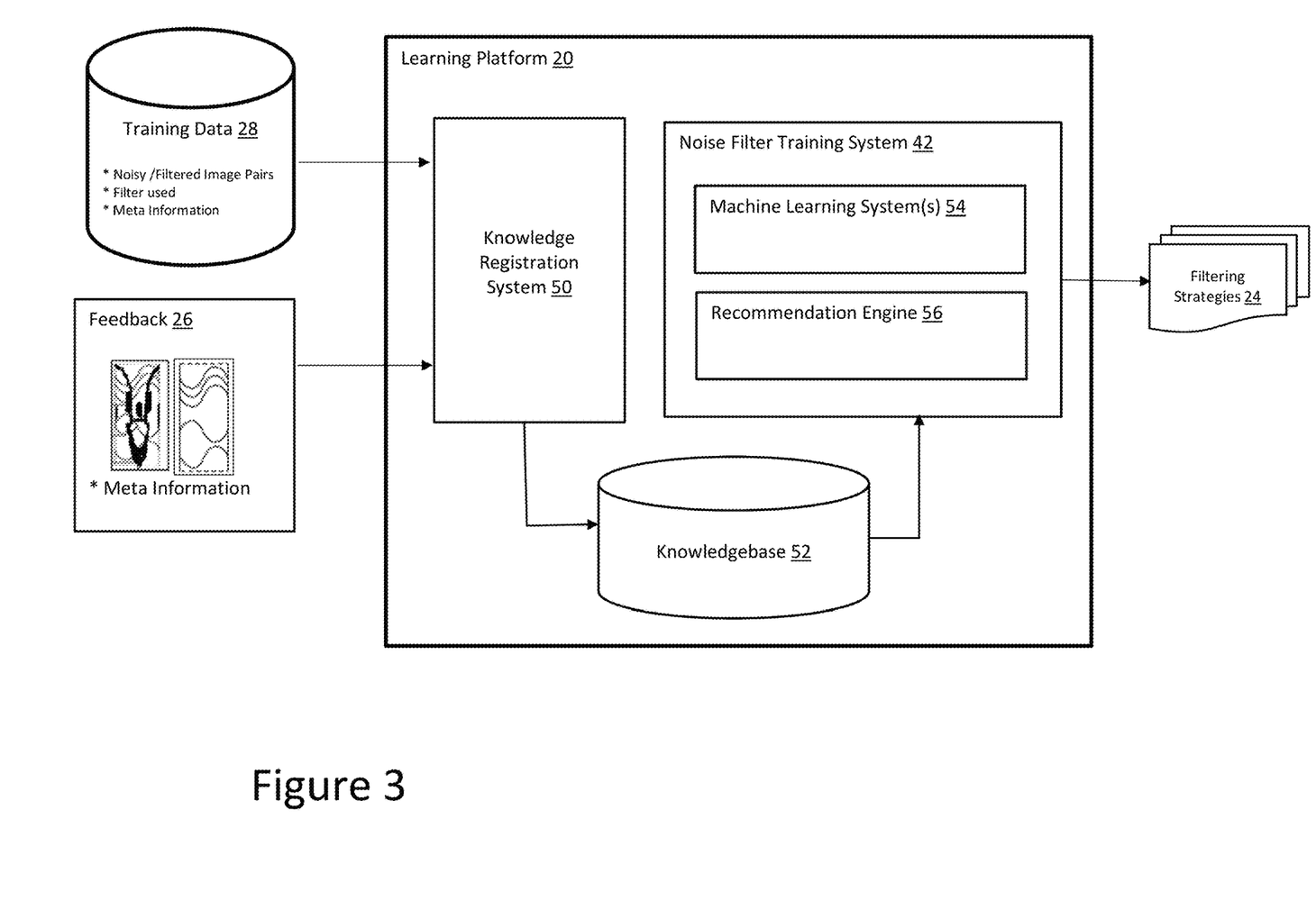
FIG. 3 shows a learning platform according to embodiments.

FIG. 2 depicts a more detailed overview of the image analysis platform 22, which can be accessed by a user via a client device 11 to process noisy well bore images to better identify natural fractures. A user interface 40 is provided through which a noisy image 30 can be selected and input. An image processing system 42 applies a set of different filtering strategies 24 to the noisy image 30, and returns a set of suggested filtered images 32, which are rendered via the user interface 40 to the client device 11 for viewing by a user. As noted, the filtering strategies 24 are obtained from the learning platform 24 (FIGS. 1 and 3).

Filtering strategies 24 may be selected and applied using any process with the goal of generating noise free images that delineate between natural and induced factures. This delineation may include, e.g., generating images that remove induced fractures, generating images that highlight natural and/or induced fractures, generating more robust images, generating images with metadata that describes what is in the image, or generating any other type of image that will provide guidance to an end user. For example, if an optical image is inputted, image processing system 42 may apply three different optical image filtering strategies 24 as provided and/or recommended by the learning platform 20. In one embodiment, the different filtering strategies 24 may involve different filter types, e.g., a spatial filter, pattern recognition using matched filters, and a digital optical filter. In other embodiments, the filtering strategies 24 may provide the same type of filter with different parameter setting. The type and number of filters may be based on the category of inputted image (e.g., optical versus acoustic), features of the image (e.g., vertical versus horizontal well), or any other criteria.

Once a set of suggested filtered images 32 are output and rendered to the client device 11 via the user interface 40, the user can select a "best" filtered image (i.e., user selected image 46) that, e.g., does not appear to include any induced fractures or that best highlights natural and induced factures. The user can for example use their own experience and expertise to evaluate the suggested filtered images 32. For example, one of the suggested filtered images 32 may show an open fracture, which is almost always indicative of an induced fracture. The user may select this image as the best for making drilling decisions 48 because it clearly identifies induced fractures that can be ignored with a high level of certainty. If none of the suggested filter images 32 are useful, the user can request that a new set of suggested filtered images 32 be generated with different filtering strategies.

Once the user selected image 46 is designated, feedback system 44 collects and packages both the original noisy image 30 and the clean user selected image 46, along with any meta information such as: the filter strategy used, user justifications and perceived quality, and then feeds the information back to the learning platform 20. Justifications may include natural language inputs entered from the end user into user interface 40 describing why they selected a given image, e.g., "image xyz best depicts the asymmetric regions from the symmetric regions." Alternatively, the user may be presented with a drop down menu from which they can select a justification from a list. Perceived quality may be assigned by the user to the selected image as well. For example, although a particular image was selected by the user as the best among the group, the selected image may also be tagged on a scale as "poor", "adequate", "very good" or "excellent".

FIG. 3 depicts a more detailed overview of the learning platform 20, which processes training data 28 and feedback 26 to generate filtering strategies 24. Learning platform 20 generally includes a knowledge registration system 50 that inputs labeled data, e.g., noisy image/filtered image pairs, type of filter applied, quality of result, justifications, etc., and stores the data in knowledgebase 52.

A noise filter training system 42 utilizes the knowledgebase 52 to identify the best filtering strategies 24 for different types of images. Noise filter training system 42 may include one or more machine learning systems 54. For example, a neural network may be employed that outputs optimal filter parameters based on an inputted type of noisy image. The neural network can be trained using existing noisy image/filtered image pairs, their associated quality, justifications, filtering used to obtain each clean image, etc. Thus, if a given set of filter parameters in the training data consistently results in high quality filtered images for a given type of input image, the neural network will be trained to output those parameters for that type of image. If, based on the feedback, slight alterations to those parameters results in even higher quality, the neural network will learn and update the filter parameters to use for the given types of inputted noisy images.

Further techniques may likewise be used to identify the best filtering strategies 24 for different types of noisy image inputs. For example, a Hough transform may be applied, which finds imperfect instances of objects within a certain class of shapes by a voting procedure. This voting procedure is carried out in a parameter space, from which object candidates are obtained as local maxima in a so-called accumulator space that is explicitly constructed by the algorithm for computing the Hough transform.

Still further, pixel classification/feature extraction techniques may be employed which starts from an initial set of measured data and builds derived values (features) intended to be informative and non-redundant, facilitating a subsequent learning and generalization steps, and in some cases leading to better human interpretations. Feature extraction is a dimensionality reduction process, where an initial set of raw variables is reduced to more manageable groups (features) for processing, while still accurately and completely describing the original data set.

Filtering strategies may be employed that model natural fractures as mathematical functions. For example, natural fractures intersect a well similar to how a (mathematical) plane intersects a (hollow) cylinder. Filtering may be implemented to look for and highlight intersections having particular characteristics (e.g., height and angle) that are indicative of natural fractures.

Image classification, based for instance on texture descriptors or convolutional neural networks, can be used to identify the type of image, to define which types of fracture should be extracted by the filtering strategy.

A recommendation engine 56 can also be integrated into the noise filter training system 42 to, e.g., provide recommendations regarding how filtered images should be evaluated by the user. For example, for a given type of noisy image and filtering strategy, the recommendation engine 56 may recommend looking for symmetrically developed fractures on each side of the borehole, which are indicative of natural fractures.

It is noted that the fracture analysis system 18 may be utilized for any type of borehole imagery, including: electrical signals collected from an FMI (Formation Micro Imager), FMS (Formation Micro Scanner), ARI (Azimuthal resistivity image) HALS (Laterolog), LWD (Logging while drilling), RAB (Resistivity-At-Bit), etc.; acoustic signals collected from an UBI (Ultrasonic Borehole Imager), DSI (Dipole Shear Sonic Imager), BHTV (Borehole Televiewer), etc.; optical signals; video signals; and nuclear signals such as gamma ray, neutron, and induced radioactivity obtained from an LWD (Loggin while drilling) tool.

The filtering strategies may be employed to identify any type of natural fracture including, e.g., vuggy, opened, partial opened, planar fractures, bedding confined fractures, and mineralized fractures. Each type of fracture is characterized with features such as orientation and depth. Similarly, induced fractures may also be identified, such as petal fractures, breakout fractures, tensile fractures, petal centraline fractures, etc.

Figure 4:
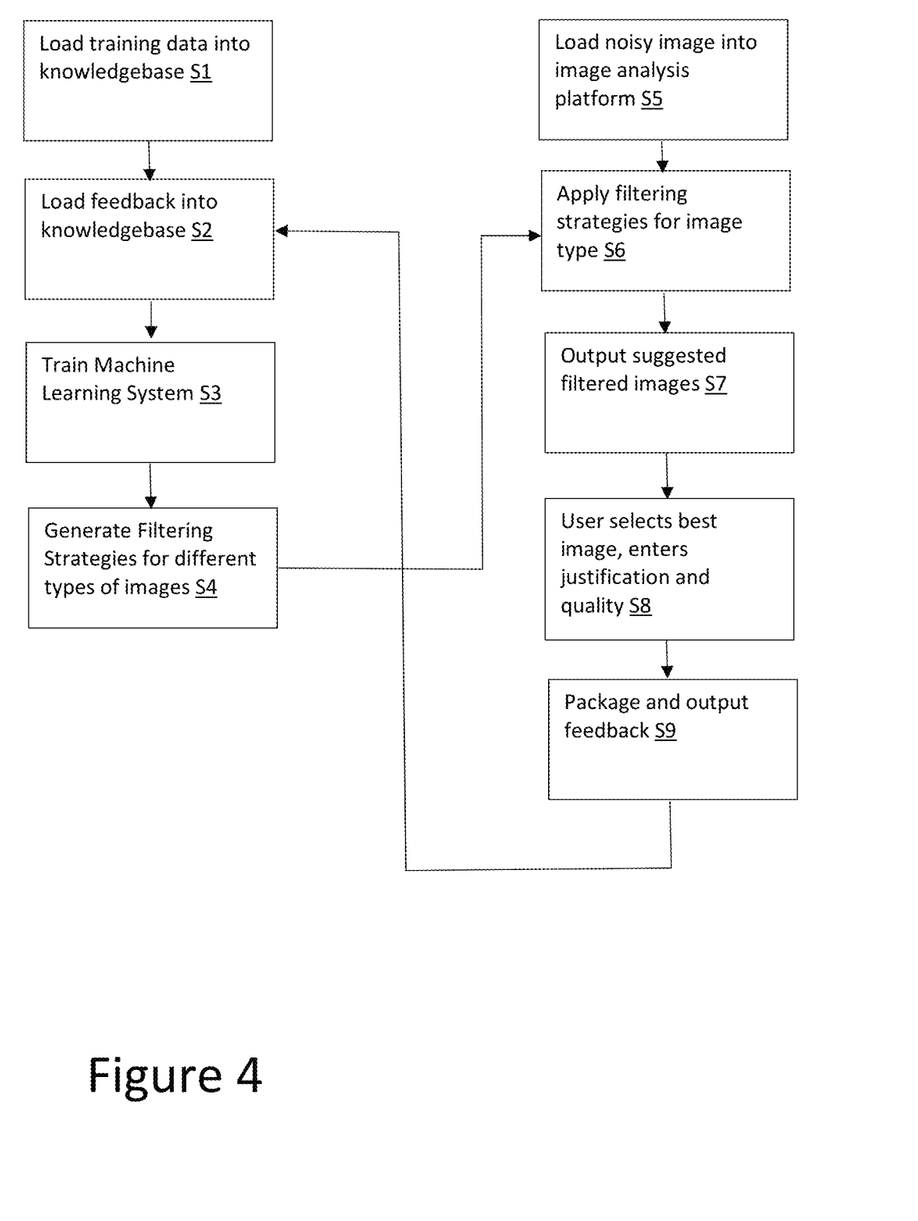
FIG. 4 shows a flow diagram of a method of implementing fracture analysis system according to embodiments.

FIG. 4 depicts a flow diagram of a method of implementing fracture analysis system 18. The left hand side represents the operation of learning platform 20 and the right hand side represents the image analysis platform 22. At S1, training data 28 is loaded into the knowledgebase 52 and at S2 feedback 26 is loaded into the knowledgebase 56. At S3, the machine learning system 54 is trained with the feedback and training data and at S4 filtering strategies for different type of images are generated.

At S5, a noisy image 30 is loaded into the image analysis platform 22 and at S6, filtering strategies for the image type of the noisy image 30 are applied. At S7, a set of suggested filtered images are output (i.e., rendered) and at S8 the user selects a best image and enters justification and quality information. At S9, feedback is packaged and output back to the learning platform at S2.

It is understood that fracture analysis system 18 (FIG. 1) may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 15, an input/output (I/O) 14 (e.g., one or more I/O interfaces and/or devices), and a communications pathway 16. In general, processor(s) 12 execute program code which is at least partially fixed in memory 15. While executing program code, processor(s) 12 can process data, which can result in reading and/or writing transformed data from/to memory and/or I/O 14 for further processing. The pathway 16 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the fracture analysis system 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A fracture analysis system that processes borehole images to delineate between natural fractures and induced fractures, comprising:
   an image analysis platform that inputs a noisy image from a borehole, processes the image using a set of filtering strategies, and renders a set of suggested filtered images via a user interface, the user interface including a mechanism for allowing a user to choose a selected filtered image from the set of suggested filtered images that best delineates between natural fractures and induced fractures, and wherein the image analysis platform further includes a feedback system for packaging and outputting the noisy image and selected filtered image as feedback; and
   a learning platform having a knowledge registration system that collects and stores training data and the feedback and in a knowledgebase, and a machine learning system that generates filtering strategies that can be applied to noisy images to delineate between natural fractures and induced fractures based on the feedback and training data for different types of borehole images.

2. The fracture analysis system of claim 1, wherein the machine learning system comprises a neural network that is trained with noisy/filtered image pairs obtained from the knowledgebase.

3. The fracture analysis system of claim 2, wherein the neural network is further trained with a justification for choosing the selected filtered image.

4. The fracture analysis system of claim 2, wherein the neural network is further trained based on a quality of each filtered image in a given noisy/filtered image pair.

5. The fracture analysis system of claim 1, wherein the user interface further includes a mechanism for allowing the user to enter a justification for choosing the selected filtered image.

6. The fracture analysis system of claim 1, wherein the borehole images are selected from a group consisting of: electrical imagery, acoustical imagery, optical imagery, video imagery or nuclear imagery.

7. The fracture analysis system of claim 1, wherein the machine learning system utilizes one of: a Hough transformation and a pixel classification.

8. A computer program product for processing borehole images to delineate between natural fractures and induced fractures, the computer program product comprising a non-transitory computer readable storage medium having a set of instructions stored therein that, when executed by a processor, causes the processor to process borehole images by:
   receiving a noisy image from a borehole;
   processing the noisy image using a set of filtering strategies;
   rendering a set of suggested filtered images via a user interface;

providing for a user to choose a selected filtered image from the set of suggested filtered images via the user interface that best delineates between natural fractures and induced fractures;

packaging and outputting the noisy image and selected filtered image as feedback;

collecting and storing training data and the feedback in a knowledgebase; and generating filtering strategies that can be applied to noisy borehole images to delineate between natural fractures and induced fractures based on the feedback and training data for different types of borehole images.

9. The program product of claim 8, wherein generating filtering strategies is performed by a neural network that is trained with noisy/filtered image pairs obtained from the knowledgebase.

10. The program product of claim 8 further causing the processor to process borehole images by providing for the user to enter a justification for choosing the selected filtered image.

11. The program product of claim 10, wherein the neural network is further trained with the justification.

12. The program product of claim 8, wherein the neural network is trained based on a quality of each filtered image in a given noisy/filtered image pair.

13. The program product of claim 8, wherein the different types of borehole images include: electrical imagery, acoustical imagery, optical imagery, video imagery, and nuclear imagery.

14. The program product of claim 8, wherein the filtering strategies utilize one of: a Hough transformation and a pixel classification.

15. A computerized method for processing borehole images to delineate between natural fractures and induced fractures, comprising:

inputting a noisy image from a borehole;

processing the noisy image using a set of filtering strategies;

rendering a set of suggested filtered images for selection via a user interface;

receiving from a user a selected filtered image from the set of suggested filtered images via the user interface that best delineates between natural fractures and induced fractures;

packaging and outputting the noisy image and selected filtered image as feedback;

collecting and storing training data and the feedback in a knowledgebase; and generating the filtering strategies that can be applied to noisy images to delineate between natural fractures and induced fractures based on the feedback and training data for different types of borehole images;

wherein:

at least the processing, packaging and outputting, and generating steps are performed by computer software running on computer hardware.

16. The computerized method of claim 15, wherein generating filtering strategies is performed by a neural network that is trained with noisy/filtered image pairs obtained from the knowledgebase.

17. The computerized method of claim 15, further comprising providing for a user to enter a justification for choosing the selected filtered image.

18. The computerized method of claim 17, wherein the neural network is further trained with the justification.

19. The computerized method of claim 15, wherein the neural network is trained based on a quality of each filtered image in a given noisy/filtered image pair.

20. The computerized method of claim 15, wherein the different types of borehole images include: electrical imagery, acoustical imagery, optical imagery; video imagery; and nuclear imagery.

* * * * *